United States Patent
Davis et al.

(10) Patent No.: US 11,621,826 B2
(45) Date of Patent: Apr. 4, 2023

(54) METHOD AND SYSTEM FOR HTTP SESSION MANAGEMENT USING HASH CHAINS

(71) Applicant: MASTERCARD INTERNATIONAL INCORPORATED, Purchase, NY (US)

(72) Inventors: Steven C. Davis, Saint Peters, MO (US); Jason Jay Lacoss-Arnold, St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 138 days.

(21) Appl. No.: 16/705,506

(22) Filed: Dec. 6, 2019

(65) Prior Publication Data
US 2021/0176046 A1    Jun. 10, 2021

(51) Int. Cl.
*H04L 9/32*    (2006.01)
*H04L 9/06*    (2006.01)
(Continued)

(52) U.S. Cl.
CPC .......... *H04L 9/0643* (2013.01); *H04L 9/0866* (2013.01); *H04L 9/3242* (2013.01); *H04L 63/123* (2013.01); *H04L 9/50* (2022.05)

(58) Field of Classification Search
CPC ... H04L 9/0643; H04L 9/0866; H04L 9/3242; H04L 63/123; H04L 2209/38
See application file for complete search history.

(56) References Cited

U.S. PATENT DOCUMENTS 5,907,621 A    5/1999    Bachman et al.
8,589,574 B1 *    11/2013    Cormie ................... H04L 67/10
                                                                709/230
(Continued)

FOREIGN PATENT DOCUMENTS

WO    00/49528 A1    8/2000
WO    2019/118720 A1    6/2019

OTHER PUBLICATIONS

Notification of Transmittal of the International Search Report (Forms PCT/ISA/220 and PCT/ISA/210) and the Written Opinion of the International Searching Authority (Form PCT/ISA/237) dated Mar. 5, 2021, by the International Application Division Korean Intellectual Property Office in corresponding International Application No. PCT/US2020/060163. (9 pages).

*Primary Examiner* — Trang T Doan
*Assistant Examiner* — Vladimir I Gavrilenko
(74) *Attorney, Agent, or Firm* — Panitch Schwarze Belisario & Nadel LLP (57) ABSTRACT

A method for performing authentication of a client device using a hash chain includes: receiving a first data request from a client device, the first data request including at least a user identifier and a first hash value; transmitting a first data response message to the client device; receiving a second data request from the client device, the second data request including at least the user identifier and a second hash value; generating a validating hash value by applying a hashing algorithm to the second hash value; validating the first hash value as being equal to the generated validating hash value; and transmitting a second data response message to the client device upon successful validation of the first (Continued)

100 hash value, wherein the second data response message includes one or more data values associated with the user identifier.

20 Claims, 6 Drawing Sheets

(51) Int. Cl.
*H04L 9/08* (2006.01)
*H04L 9/40* (2022.01)
*H04L 9/00* (2022.01)

(56) References Cited

U.S. PATENT DOCUMENTS

| | | | |
|---|---|---|---|
| 2005/0256910 | A1 | 11/2005 | Kim et al. |
| 2018/0139182 | A1 | 5/2018 | Frank et al. |
| 2018/0219857 | A1* | 8/2018 | Bhattacharya ...... H04L 63/0807 |
| 2020/0252202 | A1* | 8/2020 | Madl .................. G06F 21/6218 |
| 2020/0374106 | A1* | 11/2020 | Padmanabhan ..... G06F 16/1837 |
| 2021/0075620 | A1* | 3/2021 | Driscoll .............. H04L 63/1466 |

* cited by examiner

METHOD AND SYSTEM FOR HTTP SESSION MANAGEMENT USING HASH CHAINS

FIELD

The present disclosure relates to performing authentication of a client device using a hash chain, specifically the use of hash chains to enable ongoing authentication of a client device when a stateless protocol is used to prevent unauthorized access via intercept of session identifiers.

BACKGROUND

Stateless protocols are used throughout the world in electronic communications as a simplified and fast manner of communication. One of the most famous and widely used stateless protocols is the HyperText Transfer Protocol (HTTP), which is the underlying protocol used by the World Wide Web when users interact with web pages. Because HTTP is a stateless protocol, each interaction between a client device (e.g., a user's home computer or mobile phone) and the server (e.g., web server for the web page being visited) exists in a vacuum, without any information regarding past communications being retained. In an effort to maintain consistency across a browsing session, such as to maintain shopping carts or other user-specific information, session identifiers are often used. A session identifier is a unique value that is exchanged between the client device and server during communications, which is used by the server to identify if a received communication pertains to an earlier communication.

However, because session identifiers remain the same value over the life of a session, they are susceptible to being compromised. For instance, an unauthorized party may intercept one of the communications and obtain the session identifier therefrom, and then pose as the user. In cases of e-commerce, this may enable the unauthorized party to conduct a transaction pretending to be the user, taking advantage of the user's financial information, but receiving purchased products themselves. Even in standard browsing where there may be a seemingly low risk, disruption to normal browsing behavior may greatly inconvenience and frustrate the user, which can put the user off from the website entirely, reducing the website's traffic, advertising revenue, etc.

Thus, there is a need for a system to enable continued authentication of a client device when a stateless protocol is used, in a manner that protects against intercept of a session identifier.

SUMMARY

The present disclosure provides a description of systems and methods for performing authentication of a client device using a hash chain. A hash chain is created by taking an initial value and applying a hashing algorithm to generate a subsequent value, where the hash is a one-way hash, preventing any entity from identifying the initial value from the subsequent value. This process is repeated a large number of times, where the hash value that is created is subsequently hashed over and over, creating a chain starting with the initial value that has thus been hashed potentially thousands of times. The last value in the hash chain is used in place of a session identifier when a communication is performed via a stateless protocol. In the next communication, the previous hash value in the chain is used instead, where the server can hash the new value to obtain the earlier received value and thus confirm that the client device is the same device and is authentic. Each time a new communication is made with the server, the client device can work backwards in the chain, resulting in continued authentication. Any intercept of a communication by an unauthorized party would be fruitless as the unauthorized party would be unable to work backwards in the chain, and thus could not pose as the client device in any additional communications, providing a significant security advantage over traditional session identifiers.

A method for performing authentication of a client device using a hash chain includes: receiving, by a receiver of a processing server, a first data request from a client device, the first data request including at least a user identifier and a first hash value; transmitting, by a transmitter of the processing server, a first data response message to the client device; receiving, by the receiver of the processing server, a second data request from the client device, the second data request including at least the user identifier and a second hash value; generating, by a processor of the processing server, a validating hash value by applying a hashing algorithm to the second hash value; validating, by the processor of the processing server, the first hash value as being equal to the generated validating hash value; and transmitting, by the transmitter of the processing server, a second data response message to the client device upon successful validation of the first hash value, wherein the second data response message includes one or more data values associated with the user identifier.

A method for authentication of a client device using a hash chain includes: identifying, by a processor of a computing device, a base data value; generating, by the processor of the computing device, a hash value by applying a hashing algorithm to the identified base data value; generating, by the processor of the computing device, a subsequent hash value by applying the hashing algorithm to the generated hash value; repeating, by the processor of the computing device, the second generating step a predetermined number of times to create a chain of a plurality of hash values; transmitting, by a transmitter of the computing device, a first data request to a processing server, the first data request including at least a user identifier and a last hash value in the chain of the plurality of hash values; receiving, by a receiver of the computing device, a first data response message from the processing server; transmitting, by the transmitter of the computing device, a second data request to the processing server, the second data request including at least the user identifier and a second-to-last hash value in the chain of the plurality of hash values; and receiving, by the receiver of the computing device, a second data response message from the processing server, wherein the second data response message includes one or more data values associated with the user identifier.

A system for performing authentication of a client device using a hash chain includes: a client device; and a processing server, wherein the processing server includes a processor, a receiver receiving a first data request from a client device, the first data request including at least a user identifier and a first hash value, and a transmitter transmitting a first data response message to the client device, wherein the receiver further receives a second data request from the client device, the second data request including at least the user identifier and a second hash value, the processor generates a validating hash value by applying a hashing algorithm to the second hash value, the processor validates the first hash value as being equal to the generated validating hash value, and the transmitter further transmits a second data response message to the client device upon successful validation of the first hash value, wherein the second data response message includes one or more data values associated with the user identifier.

A system for authentication of a client device using a hash chain includes: a processing server; and a computing device, wherein the computing device includes a processor identifying a base data value, generating a hash value by applying a hashing algorithm to the identified base data value, generating a subsequent hash value by applying the hashing algorithm to the generated hash value, and repeating the second generating step a predetermined number of times to create a chain of a plurality of hash values, a transmitter transmitting a first data request to a processing server, the first data request including at least a user identifier and a last hash value in the chain of the plurality of hash values, and a receiver of the computing device receiving a first data response message from the processing server, wherein the transmitter further transmits a second data request to the processing server, the second data request including at least the user identifier and a second-to-last hash value in the chain of the plurality of hash values, and the receiver further receives a second data response message from the processing server, wherein the second data response message includes one or more data values associated with the user identifier.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Authentication of Client Devices Using Hash Chains

Figure 1:
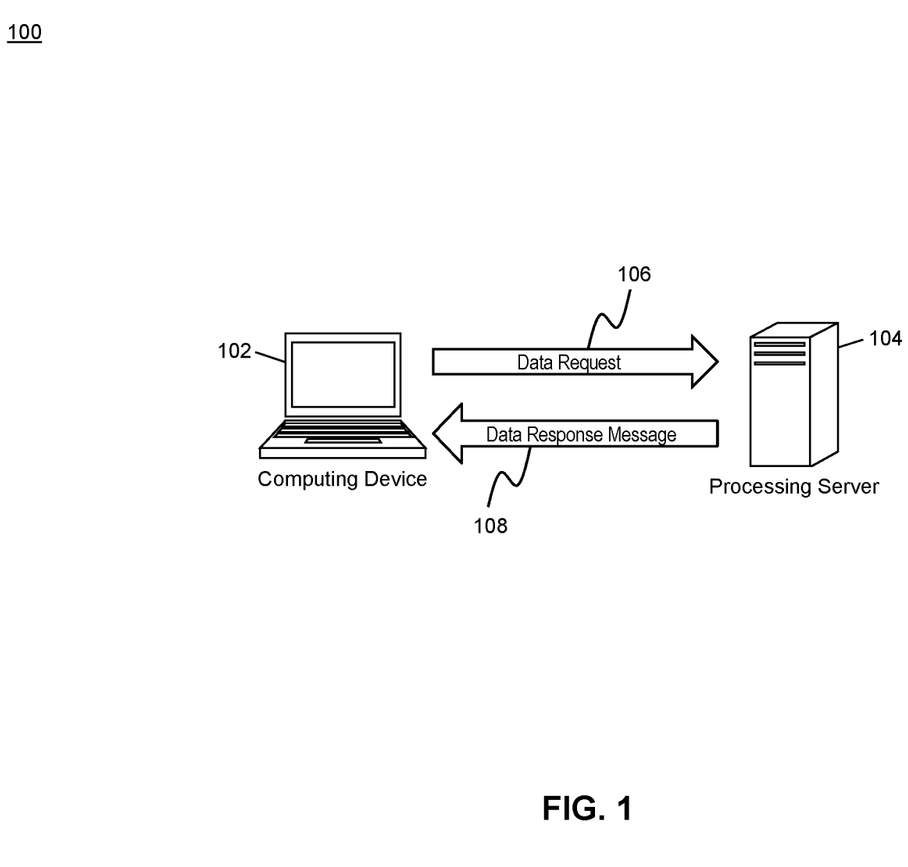
FIG. 1 is a block diagram illustrating a high level system architecture for performing authentication of a client device using a hash chain in accordance with exemplary embodiments.

FIG. 1 illustrates a system 100 for the authentication of a client device via the use of hash chains, such as when a stateless protocol is used for communications between the client device and a server.

In the system 100, a computing device 102 may operate as a client device and communicate with a processing server 104. In an exemplary embodiment, communications between the computing device 102 and the processing server 104 may utilize a stateless protocol, such as HTTP. For example, the computing device 102 may be a user computer and the processing server 104 may be a web server, where the user of the computing device 104 may be attempting to access a web page hosted by the processing server 104. The computing device 102 and processing server 104 may be any type of computing system that is specially configured to perform the functions discussed herein, such as the computing system 200 illustrated in FIG. 2 or the computing system 600 illustrated in FIG. 6, as discussed in more detail below.

In the system 100, the computing device 102 may electronically transmit a data request 106 to the processing server 104 using any suitable communication network. In an exemplary embodiment, the data request 106 may be transmitted using a stateless protocol, such as HTTP. In traditional systems, the data request 106 may include a session identifier that is used for ongoing authentication and identification of the computing device 102. In the system 100, the computing device 102 may utilize a hash chain in place of session identifiers.

The computing device 102 may begin with an initial value. The initial value can be randomly or pseudo-randomly generated, selected by the user of the computing device 102, or otherwise identified using any suitable method. For instance, the computing device 102 may generate a random 32-digit alphanumeric string each time a new session is started with a processing server 104 to serve as the initial value. Once the initial value, herein referred to as X, is identified, the computing device 102 may hash the initial value by applying a hashing algorithm thereto to obtain a new hash value, referred to herein as H(X). The hashing algorithm may be a one-way cryptographic hash function such that there is no way to identify X from H(X). Once the hash value H(X) has been obtained, the computing device 102 may repeat the process by hashing the value again to obtain the hash value H(H(X)), also referred to herein as $H_2(X)$. The computing device 102 may continue to repeat the process a large number, n, of times to arrive at a final value $H_n(X)$ in the hash chain.

When the computing device 102 submits the data request 106 to the processing server 104, the data request may include the final value $H_n(X)$ in the hash chain. The processing server 104 may receive the data request including the hash value and store the hash value as being associated with a new session. The processing server 104 may then provide a data response message 108 to the computing device 102 with the requested data. For instance, in the above example, the processing server 104 may be a web server where the data response message 108 includes web page data to be displayed to a user of the computing device 102 via a web browsing application program.

When a new data request is to be submitted to the processing server 104 by the computing device 102 (e.g., the user has clicked a link on the web page to continue their browsing experience on the web site), the computing device 102 may go backwards one step in the hash chain to $H_{n-1}(X)$ and include that value in the next data request 106 that is submitted to the processing server 104. The processing server 104 may receive the data request with the hash value $H_{n-1}(X)$. In order to authenticate that the computing device 102 is associated with an earlier session, the processing server 104 may hash the hash value $H_{n-1}(X)$ that was received in the data request 106. The resulting value may thus be $H_n(X)$, which the processing server 104 may identify matches with an earlier received data request 106 as stored therein and may therefore attribute the new data request 106 to the earlier session. The computing device 102 and processing server 104 may continue to communicate, where each subsequent communication uses a hash value from one earlier in the chain to the latest hash value that was used, working back from $H_n(X)$ to $H_1(X)$. As a result, the computing device 102 can be continually authenticated without any concern of intercept. If an unauthorized party intercepts $H_n(X)$, they will be unable to make any future, authenticated communications as the party will be unable to obtain $H_{n-1}(X)$ and will therefore not be authenticated in any subsequent attempts.

As a result, the processing server 104 and computing device 102 can continue to communicate securely with hash values used in place of traditional session identifiers, where the computing device 102 must simply generate a hash chain prior to any communication sessions. In cases where a sufficient number n is used, a single hash chain may be all that is necessary in a communication session. For instance, the computing device 102 may generate a hash chain of 1,000 values, where $H_{1000}(X)$ is the first value sent to the processing server 104, followed by $H_{999}(X)$, and so on. In such an instance, it would take 1,000 data requests 106 before a new hash chain would need to be started.

In cases where such an instance may occur, the computing device 102 and processing server 104 may be configured to switch to a new hash chain at any time as requested by the processing server 104 (e.g., when $H_1(X)$ is being used as the hash value in a data request 106). In such instances, the processing server 104 may include $H_1(X)$ as well as $H_n(Y)$ of a new hash chain with initial value Y both in a data request 106, where the two values may be separated by a predetermined delimiter value (e.g., "|", "-", or other value that may not be found in the hash value, such as any non-alphanumeric value). The processing server 104 may receive the data request 106, where the received hash value may be twice the expected size (e.g., 513 bits instead of 256 bits, due to both hash values and the delimiter), and may identify that a new hash chain is being used. The processing server 104 may use $H_1(X)$ to authenticate the computing device 102 and may store $H_n(Y)$ for use in authentication for the next received data request 106. As a result, the session may be continued indefinitely regardless of the size of the hash chain that is used.

Communications between the computing device 102 and processing server 104 may use any suitable communication network and method and may be performed via any stateless protocol and method associated therewith. For instance, as discussed above, the computing device 102 and processing server 104 may communicate using HTTP. In such an instance, the hash chain may be included in an HTTP header that is transmitted in or with the data request 106. In such cases, the HTTP header may include the hash value and any other information associated therewith, such as by specifying the hashing algorithm used (e.g., SHA-256), a username, token, etc. In some cases, timeouts or other techniques associated with authentication may also be used.

In some instances, an initial authentication may be performed prior to the use of continuous authentication provided via use of the hash chains. For instance, an initial request submitted to the processing server 104 from the computing device 102 may include an authentication token or other data that may be used by the processing server 104 to authenticate the user of the computing device 102. For example, an initial communication may include a user identifier (e.g., a username) and an authentication token, which may accompany or precede the first value in the hash chain. In some cases, authentication may be performed, where the authentication token is provided as a result of the authentication, such as where a user of the computing device 102 may log in via a web page, and be provided an authentication token as a result of the login that is included in the initial communication in the session.

The methods and systems discussed herein enable a computing device 102 and processing server 104 to maintain a secure communication session, even when a stateless protocol is used, where intercept or compromise of any individual communication will not enable an unauthorized party to pose as the client device and be a party to any future communications between the systems. For instance, the use of a stateless protocol would prevent a man-in-the-middle attack, and the payload itself would not need to be modified. Thus, the methods and systems discussed herein provide for a significantly security improvement over existing methods and systems, while being able to utilize existing stateless protocols with minimal adjustments to involved systems.

Computing System

Figure 2:
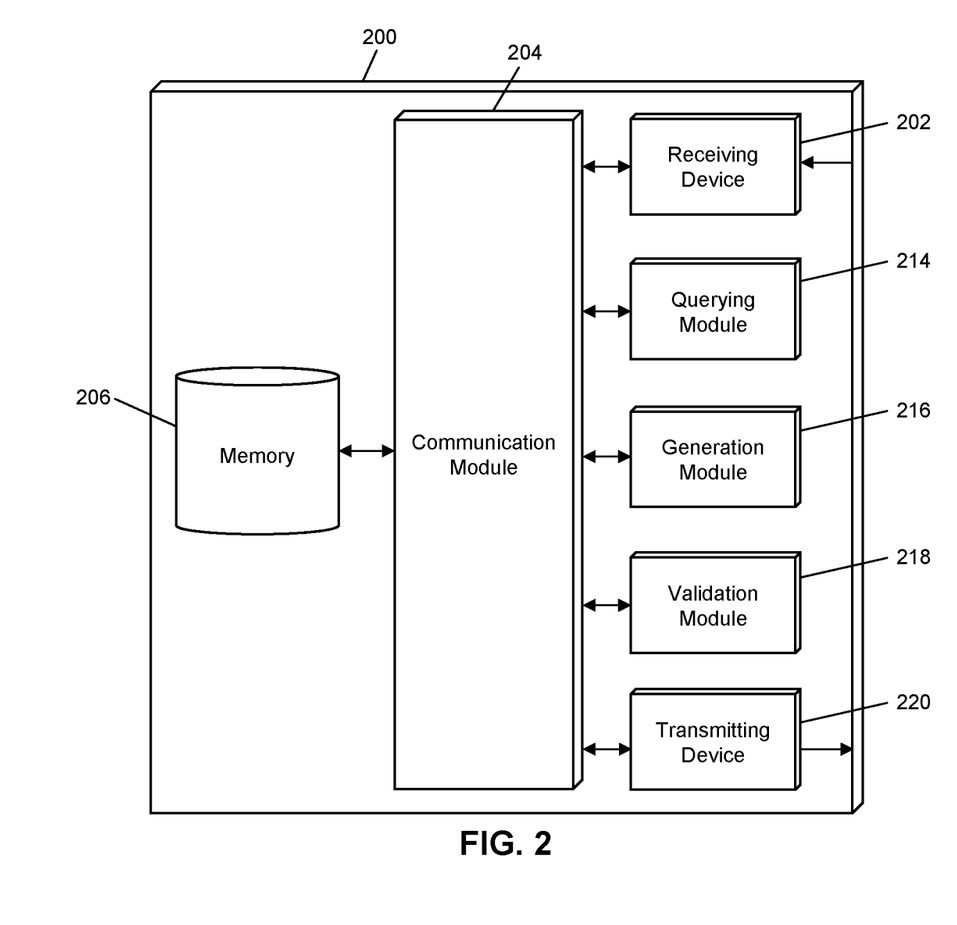
FIG. 2 is a block diagram illustrating a computing system of the system of FIG. 1 for performing authentication using hash chains in accordance with exemplary embodiments.

FIG. 2 illustrates an embodiment of a computing system 200, such as may serve as the computing device 102 and/or processing server 104 in the system 100. It will be apparent to persons having skill in the relevant art that the embodiment of the computing system 200 illustrated in FIG. 2 is provided as illustration only and may not be exhaustive to all possible configurations of the computing system 200 suitable for performing the functions as discussed herein. For example, the computer system 600 illustrated in FIG. 6 and discussed in more detail below may be a suitable configuration of the computing system 200.

The computing system 200 may include a receiving device 202. The receiving device 202 may be configured to receive data over one or more networks via one or more network protocols. In some instances, the receiving device 202 may be configured to receive data from computing devices 102, processing server 104, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 102 that may be superimposed or otherwise encoded with data requests 106, which may include a hash value. The receiving device 202 may also be configured to receive data signals electronically transmitted by processing servers 104, which may be superimposed or otherwise encoded with data response messages 108.

The computing system 200 may also include a communication module 204. The communication module 204 may be configured to transmit data between modules, engines, databases, memories, and other components of the computing system 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing system 200 and external components of the computing system 200, such as externally connected databases, display devices, input devices, etc. The computing system 200 may also include a processing device. The processing device may be configured to perform the functions of the computing system 200 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing system 200 may also include a memory 206. The memory 206 may be configured to store data for use by the computing system 200 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the computing system 200 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein. The memory 206 may be configured to store, for example, cryptographic keys, salts, nonces, communication information for the back-end system, etc.

The memory 206 may be configured to store a hash chain and data associated therewith. In computing devices 102, the memory 206 may store one or more initial values and any hash chain values associated therewith. In the processing server 104, the memory 206 may store a received hash value as part of a received data request 106 for use in authentication of future received data requests 106, where such a stored hash value may be replaced when an authentication occurs (e.g., by the newly received hash value that was hashed and compared to the prior stored value for authentication).

The computing system 200 may include a querying module 214. The querying module 214 may be configured to execute queries on databases to identify information. The querying module 214 may receive one or more data values or query strings, and may execute a query string based thereon on an indicated database, such as the institution database 206 of the computing system 200 to identify information stored therein. The querying module 214 may then output the identified information to an appropriate engine or module of the computing system 200 as necessary. The querying module 214 may, for example, execute a query on the memory 206 of the computing system 200 to identify a hash value for inclusion in a data request 106 to be transmitted to a processing server 104.

The computing system 200 may also include a generation module 216. The generation module 216 may be configured to generate data for use by the computing system 200 in performing the functions discussed herein. The generation module 216 may receive instructions as input, may generate data based on the instructions, and may output the generated data to one or more modules of the computing system 200. For example, the generation module 216 may be configured to generate hash values via the application of hashing algorithms to initial values or prior hash values, such as for use in generating a hash chain or for authenticating a computing device 102.

The computing system 200 may also include a validation module 218. The validation module 218 may be configured to perform validations and verifications for the computing system 200 as part of the functions discussed herein. The validation module 218 may receive instructions as input, which may include data to be validated and/or data to be used in the validation. The validation module 218 may perform a validation or verification as requested and may output a result of the validation to another module or engine of the computing system 200. The validation module 218 may, for example, be configured to validate a hash value included in a received data request 106 by hashing the hash value and comparing it to a previously received and stored value.

The computing system 200 may also include a transmitting device 220. The transmitting device 220 may be configured to transmit data over one or more networks via one or more network protocols. In some instances, the transmitting device 220 may be configured to transmit data to computing devices 102, processing servers 104, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to processing servers 104 that are superimposed or otherwise encoded with data requests 106, which may include hash values, algorithm information, usernames, and/or any other data used in the functions as discussed herein. The transmitting device 220 may also be configured to electronically transmit data signals to computing devices 102 that may be superimposed or otherwise encoded with a data response message 108, such as may include web page data or any other information transmitted to the computing device 102 in response to a data request 106.

Process for Authentication of a Client Device Using Hash Chains

Figure 3:
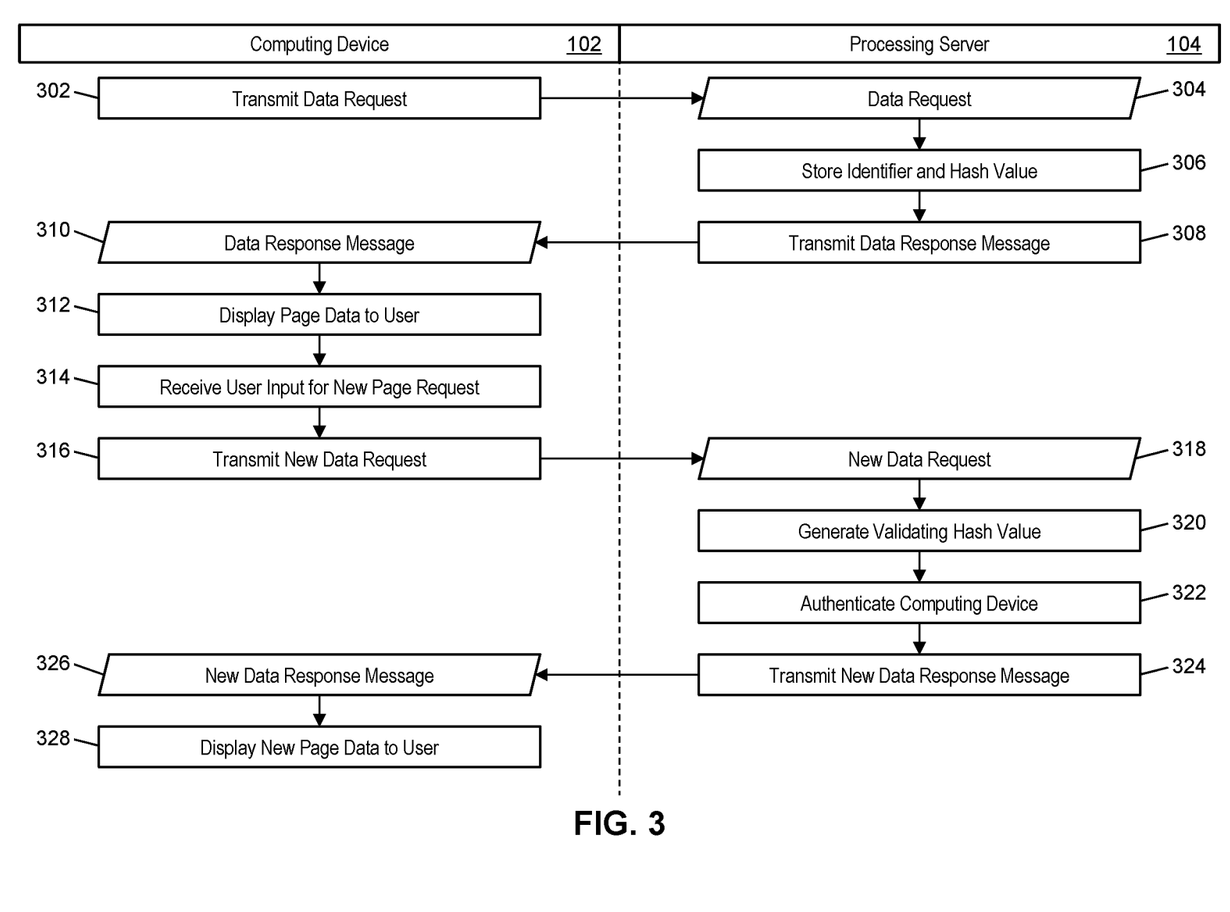
FIG. 3 is a flow diagram illustrating a process for authenticating a client device in the system of FIG. 1 using hash chains in accordance with exemplary embodiments.

FIG. 3 illustrates an example process executed in the system 100 of FIG. 1 for the authentication of the computing device 102 by the processing server 104 using a hash chain.

In step 302, the computing device 102 may electronically transmit (e.g., via a transmitting device 220) a data request 106 to the processing server 104 to start a communication session therewith using any suitable communication method. In step 304, the processing server 104 may receive (e.g., via a receiving device 202) the data request 106, where the data request may include a user identifier and the last value in a hash chain, such as $H_{1000}(X)$ in a hash chain of 1,000 values. In step 306, the processing server 104 may store (e.g., via a query executed by a querying module 214) the user identifier and $H_{1000}(X)$ in a memory 206 thereof. In step 308, a data response message 108 may be electronically transmitted (e.g., via a transmitting device 220) to the computing device 102 by the processing server 104.

In step 310, the computing device 102 may receive (e.g., via a receiving device 202) the data response message 108 from the processing server 104. In step 312, the computing device 102 may display web page data to a user of the computing device 102 as may be included in the received data response message 108. In step 314, the computing device 102 may receive user input from the user thereof for requesting a new web page, such as via clicking on a hyperlink or button included in the displayed web page. In step 316, the computing device 102 may transmit a new data request 106 to the processing server 104 that includes the next hash value in the hash chain, $H_{999}(X)$, as well as the user identifier. In step 318, the processing server 104 may receive the new data request 106.

In step 320, the processing server 104 may (e.g., via a generation module 216 thereof) generate a validating hash value by hashing the received $H_{999}(X)$ from the new data request 106. In step 322, the processing server 104 may authenticate (e.g., via a validation module 218 thereof) the computing device 102 by comparing the generated validating hash value to the $H_{1000}(X)$ stored in the memory 206 that was received in the initial data request 106 in step 304. If the validating hash value matches with the stored $H_{1000}(X)$, then the computing device 102 may be successfully authenticated. In step 324, the processing server 104 may transmit a new data response message 108 to the computing device 102 that includes web page data for the continued session with the user of the computing device 102. In step 326, the computing device 102 may receive the new data response message 108. In step 328, the new web page data included in the new data response message 108 may be displayed to the user of the computing device 102, via a web browsing application program thereof.

First Exemplary Method for Authentication Using Hash Chains

Figure 4:
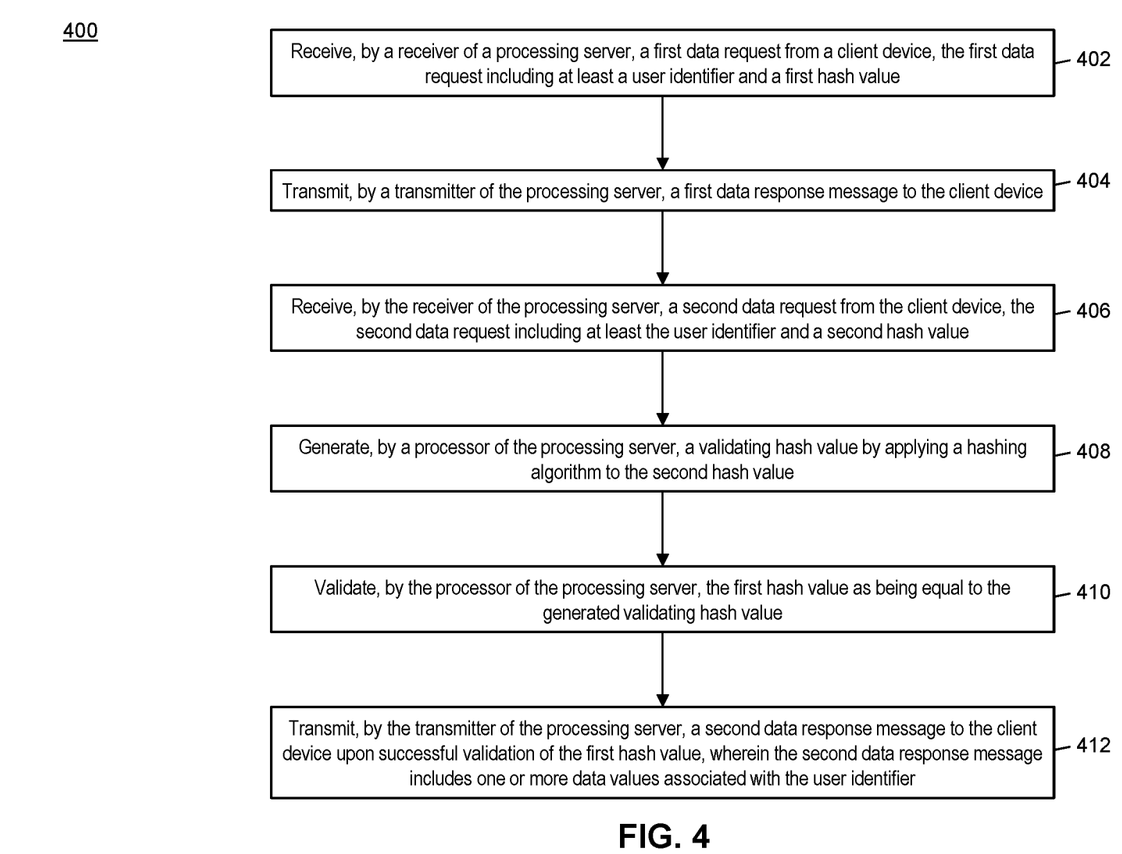
FIGS. 4 and 5 are flow charts illustrating exemplary methods for authentication of a client device using a hash chain in accordance with exemplary embodiments.

FIG. 4 illustrates a method 400 for performing authentication of a client device using a hash chain in the perspective of the processing server 104 in the system 100 of FIG. 1.

In step 402, a first data request (e.g., data request 106) may be received from a client device (e.g., the computing device 102) by a receiver (e.g., the receiving device 202) of a processing server (e.g., the processing server 104), the first data request including at least a user identifier and a first hash value. In step 404, a first data response message (e.g., data response message 108) may be transmitted by a transmitter (e.g., the transmitting device 220) of the processing server to the client device. In step 406, a second data request may be received by the receiver of the processing server from the client device, the second data request including at least the user identifier and a second hash value.

In step 408, a validating hash value may be generated by a processor (e.g., the generation module 216) of the processing server by applying a hashing algorithm to the second hash value. In step 410, the first hash value may be validated by the processor (e.g., the validation module 218) of the processing server as being equal to the generated validating hash value. In step 412, a second data response message may be transmitted by the transmitter of the processing server to the client device upon successful validation of the first hash value, wherein the second data response message includes one or more data values associated with the user identifier.

In one embodiment, the first and second data requests may be transmitted and received using a stateless protocol. In some embodiments, the second data request may include an identification of the hashing algorithm. In one embodiment, the second data response message may be transmitted to the client device without the one or more data values if validation of the first hash value is unsuccessful.

Second Exemplary Method for Authentication Using Hash Chains

Figure 5:
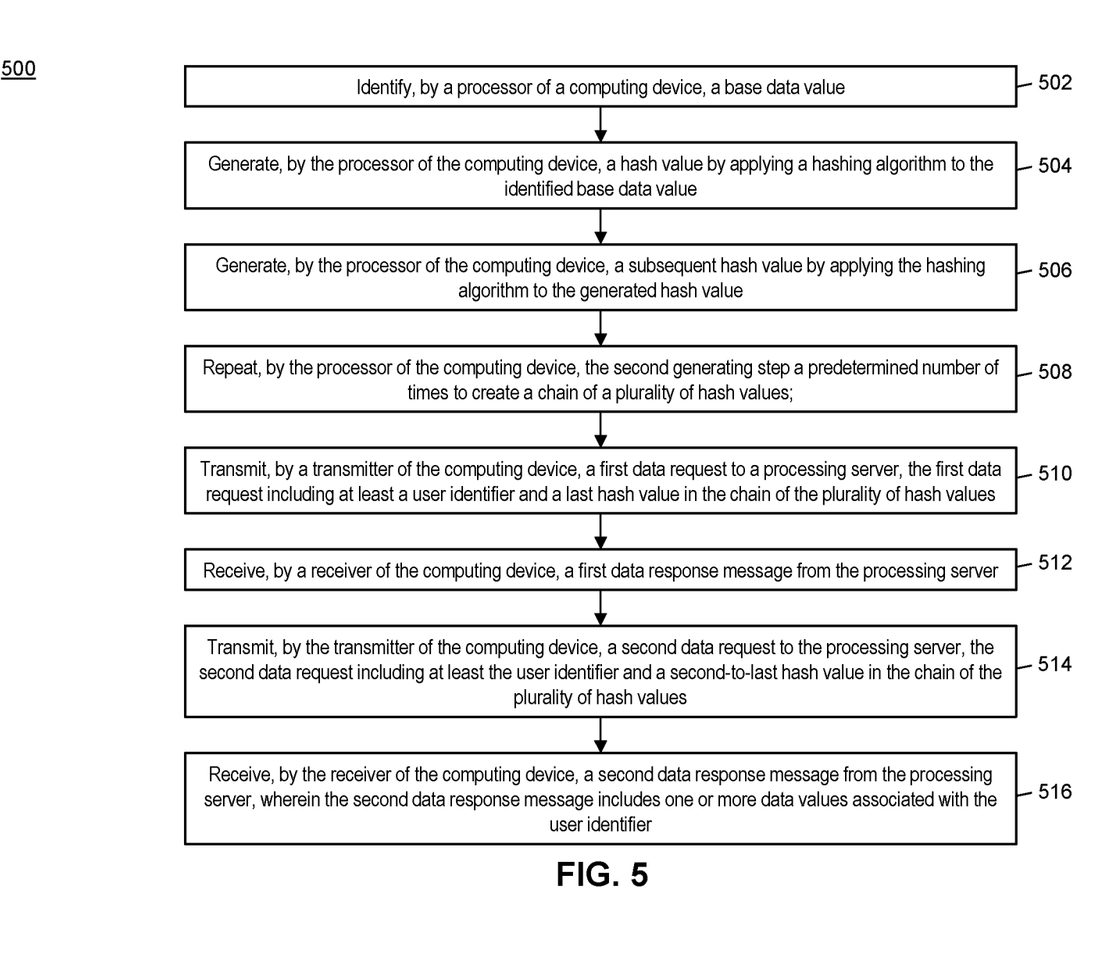

FIG. 5 illustrates a method 500 for performing authentication of a client device using a hash chain in the perspective of the computing device 102 in the system 100 of FIG. 1.

In step 502, a base data value may be identified by a processor (e.g., the generation module 216) of a computing device (e.g., the computing device 102). In step 504, a hash value may be generated by the processor of the computing device by applying a hashing algorithm to the identified base data value. In step 506, a subsequent hash value may be generated by the processor of the computing device by applying the hashing algorithm to the generated hash value.

In step 508, the second generating step may be repeated by the processor of the computing device a predetermined number of times to create a chain of a plurality of hash values. In step 510, a first data request (e.g., data request 106) may be transmitted by a transmitter (e.g., the transmitting device 220) of the computing device to a processing server (e.g., the processing server 104), the first data request including at least a user identifier and a last hash value in the chain of the plurality of hash values. In step 512, a first data response message (e.g., data response message 108) may be received by a receiver (e.g., the receiving device 202) of the computing device from the processing server.

In step 514, a second data request may be transmitted to the processing server by the transmitter of the computing device, the second data request including at least the user identifier and a second-to-last hash value in the chain of the plurality of hash values. In step 516, a second data response message may be received by the receiver of the computing device from the processing server, wherein the second data response message includes one or more data values associated with the user identifier.

In one embodiment, the first and second data requests may be transmitted and received using a stateless protocol. In some embodiments, the second data request may include an identification of the hashing algorithm. In one embodiment, the user identifier and last hash value may be included in a header of the first data request.

Computer System Architecture

Figure 6:
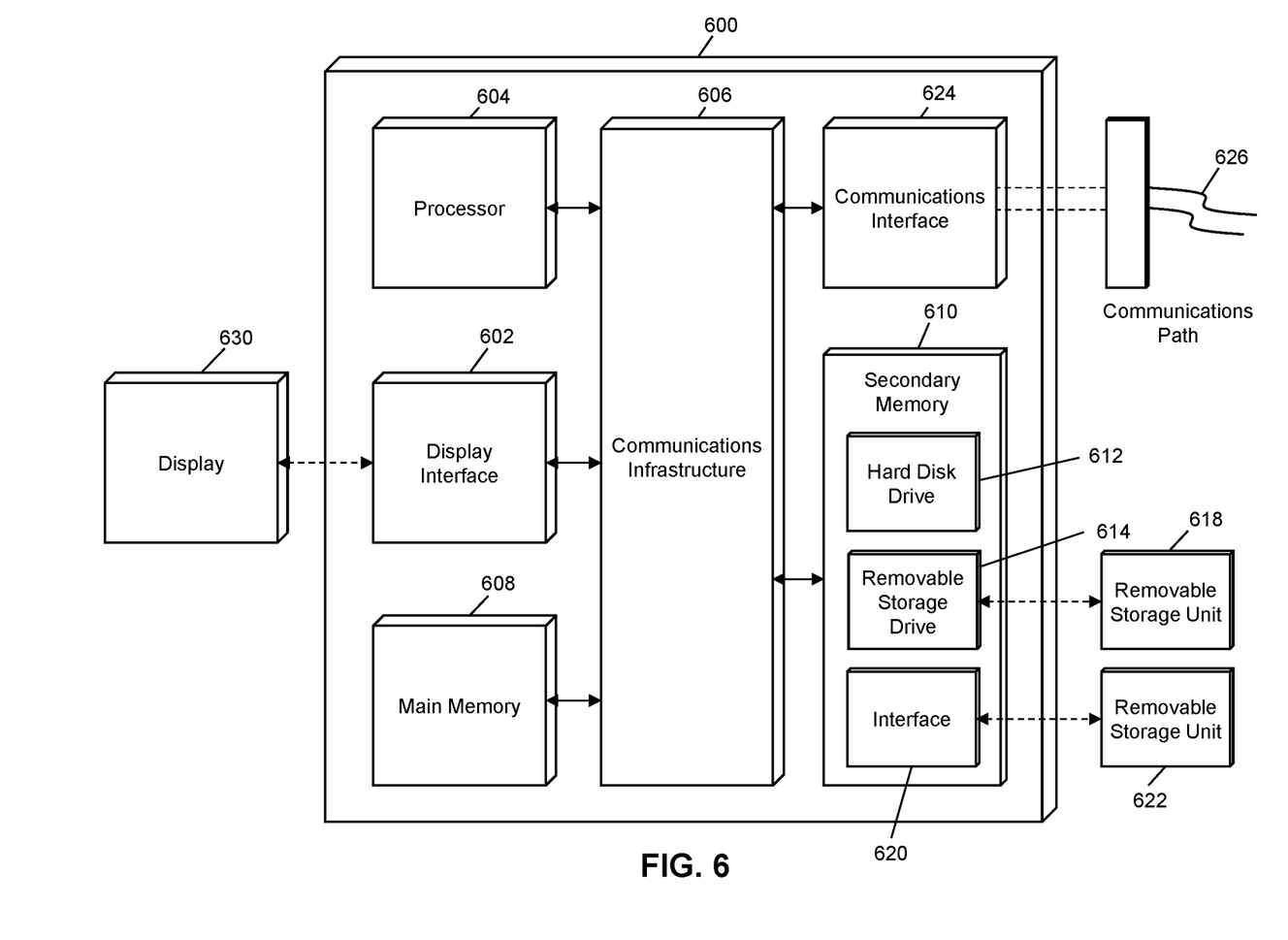
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the computing device 102 and processing server 104 of FIG. 1 and the computing system 200 of FIG. 2 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for authentication of a client device using a hash chain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for performing authentication of a client device using a hash chain, comprising:
    receiving, by a receiver of a processing server, a first data request from a client device, the first data request including at least a user identifier and a first hash value from a first hash chain created by the client device;
    transmitting, by a transmitter of the processing server, a first data response message to the client device;
    receiving, by the receiver of the processing server, a second data request from the client device from which the first data request was received, the second data request including at least the user identifier and a second hash value from the first hash chain created by the client device;
    generating, by a processor of the processing server, a validating hash value by applying a hashing algorithm to the second hash value received in the second data request from the client device from which the first data request was received;
    validating, by the processor of the processing server, the first hash value received in the first data request from the client device as being equal to the generated validating hash value;
    transmitting, by the transmitter of the processing server, a second data response message to the client device upon successful validation of the first hash value, wherein the second data response message includes one or more data values associated with the user identifier, and
    receiving, by the receiver of the processing server, a third data request from the client device, the third data request including (i) a final hash value from the first hash chain created by the client device, (ii) a first hash value from a second hash chain created by the client device, wherein the second hash chain is different from the first hash chain, and (iii) a predetermined delimiter value separating the final hash value from the first hash chain and the first hash value from the second hash chain.

2. The method of claim 1, wherein the first and second data requests are transmitted and received using a stateless protocol.

3. The method of claim 1, wherein the second data request includes an identification of the hashing algorithm.

4. The method of claim 1, wherein the second data response message is transmitted to the client device without the one or more data values if validation of the first hash value is unsuccessful.

5. The method of claim 1, wherein the third data request is of twice an expected size.

6. A method for authentication of a client device using a hash chain, comprising:
    an identifying step of identifying, by a processor of a computing device, a base data value;
    a first generating step of generating, by the processor of the computing device, a first hash value by applying a hashing algorithm to the identified base data value;
    a second generating step of generating, by the processor of the computing device, a subsequent hash value by applying the hashing algorithm to the generated first hash value;
    a first creating step of creating, by the processor, a first hash chain of a plurality of hash values by repeating, by the processor of the computing device, the second generating step a predetermined number of times;
    a first transmitting step of transmitting, by a transmitter of the computing device, a first data request to a processing server, the first data request including at least a user identifier and a final hash value from the first hash chain of the plurality of hash values;
    a first receiving step of receiving, by a receiver of the computing device, a first data response message from the processing server;
    a second transmitting step of transmitting, by the transmitter of the computing device, a second data request to the processing server, the second data request including at least the user identifier and a second-to-final hash value from the first hash chain of the plurality of hash values;
    a second receiving step of receiving, by the receiver of the computing device, a second data response message from the processing server, wherein the second data response message includes one or more data values associated with the user identifier;

a second creating step of creating, by the processor, a second hash chain including a plurality of hash values, wherein the second hash chain is different from the first hash chain; and a third transmitting step of transmitting, by the transmitter of the computing device, a third data request to the processing server, the third data request including (i) a first hash value from the first hash chain, (ii) a final hash value from the second hash chain, and (iii) a predetermined delimiter value separating the first hash value from the first hash chain and the final hash value from the second hash chain.

7. The method of claim 6, wherein the first and second data requests are transmitted and received using a stateless protocol.

8. The method of claim 6, the second data request includes an identification of the hashing algorithm.

9. The method of claim 6, wherein the user identifier and final hash value are included in a header of the first data request.

10. The method of claim 6, wherein the third data request is of twice an expected size.

11. A system for performing authentication of a client device using a hash chain, comprising:
 a client device; and
 a processing server, wherein the processing server includes
  a processor,
  a receiver receiving a first data request from a client device, the first data request including at least a user identifier and a first hash value of a first hash chain created by the client device, and
  a transmitter transmitting a first data response message to the client device, wherein
  the receiver further receives a second data request from the client device from which the first data request was received, the second data request including at least the user identifier and a second hash value from the first hash chain created by the client device,
  the processor generates a validating hash value by applying a hashing algorithm to the second hash value received in the second data request from the client device from which the first data request was received,
  the processor validates the first hash value received in the first data request from the client device as being equal to the generated validating hash value,
  the transmitter further transmits a second data response message to the client device upon successful validation of the first hash value, wherein the second data response message includes one or more data values associated with the user identifier, and
  the receiver further receives a third data request from the client device, the third data request including (i) a final hash value from the first hash chain created by the client device, (ii) a first hash value from a second hash chain created by the client device, wherein the second hash chain is different from the first hash chain, and (iii) a predetermined delimiter value separating the final hash value from the first hash chain and the first hash value from the second hash chain.

12. The system of claim 11, wherein the first and second data requests are transmitted and received using a stateless protocol.

13. The system of claim 11, wherein the second data request includes an identification of the hashing algorithm.

14. The system of claim 11, wherein the second data response message is transmitted to the client device without the one or more data values if validation of the first hash value is unsuccessful.

15. The system of claim 11, wherein the third data request is of twice an expected size.

16. A system for authentication of a client device using a hash chain, comprising:
 a processing server; and
 a computing device, wherein the computing device includes
  a processor (i) identifying a base data value, (ii) generating, in a first generation step, a first hash value by applying a hashing algorithm to the identified base data value, (iii) generating, in a second generating step, a subsequent hash value by applying the hashing algorithm to the generated first hash value, and (iv) creating a first hash chain of a plurality of hash values by repeating the second generating step a predetermined number of times,
  a transmitter transmitting a first data request to a processing server, the first data request including at least a user identifier and a final hash value from the first hash chain of the plurality of hash values, and
  a receiver of the computing device receiving a first data response message from the processing server, wherein
  the transmitter further transmits a second data request to the processing server, the second data request including at least the user identifier and a second-to-final hash value from the first hash chain of the plurality of hash values,
  the receiver further receives a second data response message from the processing server, wherein the second data response message includes one or more data values associated with the user identifier,
  the processor further creates a second hash chain different from the first hash chain, wherein the second hash chain includes a plurality of hash values; and
  the transmitter further transmits a third data request to the processing server, the third data request including (i) a first hash value from the first hash chain, (ii) a final hash value from the second hash chain, and (iii) a predetermined delimiter value separating the first hash value from the first hash chain and the final hash value from the second hash chain.

17. The system of claim 16, wherein the first and second data requests are transmitted and received using a stateless protocol.

18. The system of claim 16, the second data request includes an identification of the hashing algorithm.

19. The system of claim 16, wherein the user identifier and the final hash value are included in a header of the first data request.

20. The system of claim 16, wherein the third data request is of twice an expected size.

* * * * *